(No Model.)
E. W. RICE, Jr.
CONSTANT POTENTIAL ALTERNATING GENERATOR.
No. 567,197. Patented Sept. 8, 1896.
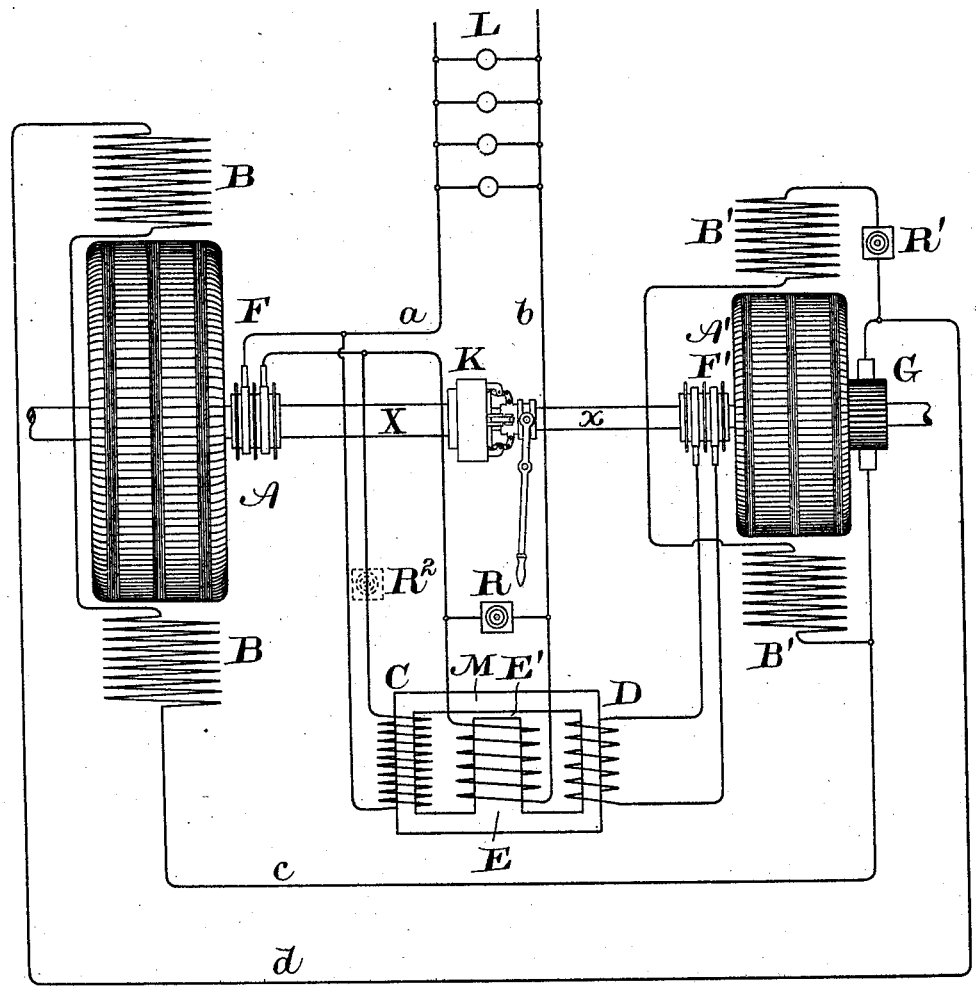
WITNESSES.
A. H. Abell.
A. F. Macdonald
INVENTOR.
Edwin W. Rice, Jr.
by Geo. R. Blodgett.
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

CONSTANT-POTENTIAL ALTERNATING GENERATOR.

SPECIFICATION forming part of Letters Patent No. 567,197, dated September 8, 1896.

Application filed May 15, 1896. Serial No. 591,668. (No model.)

*To all whom it may concern:*

Be it known that I, EDWIN W. RICE, Jr., a citizen of the United States, residing at Schenectady, in the county of Schenectady, State of New York, have invented certain new and useful Improvements in Exciting Alternators, (Case No. 358,) of which the following is a specification.

My invention relates to the excitation of the field-magnets of alternators, and has for its object to provide an efficient means of excitation which shall also act as a compounding or regulating means changing the voltage of the machine in accordance with its output, and also compensating for lead and lag or displacement of the electromotive force and current in the circuit.

To the ends pointed out I provide as a means of exciting the field-magnets of the alternator (which may be of any desired type and furnish currents of any number of phases) a rotary converter driven by the current of the main machine, between which and the main machine I introduce a transformer, in the construction of which I provide a compensation for phase-displacement. The transformer is of peculiar construction in that it is provided with a primary in shunt to the mains, a secondary going to the alternating side of the rotary converter, and a modifying-coil, this latter coil being wound upon a part of the core of the transformer which acts as a shunt across the magnetic circuit. The modifying-coil is wound to oppose the magneto motive force in this part of the transformer-core and is in series in one of the mains. Suitable resistances are also provided by which the regulation may be modified in ways hereinafter pointed out.

With the arrangement just described the primary coil of the transformer sets up an electromotive force in the secondary which sends current to the armature of the rotary converter, and the resistances being suitably adjusted the output of the converter is so controlled as to effect the field-magnet excitation of the main alternator in the way desired. A certain proportion of the magnetism in the transformer-core set up by the primary winding passes through the magnetic shunt between the primary and secondary windings. When the load upon the machine changes the current in the modifying-coil upon the transformer, the opposing magnetomotive force in the shunt also changes, thus changing the amount of opposition to the lines of force in the shunt and forcing more or less of them (according to the character of the current change) through the secondary winding, changing the induced electromotive force and thus the current delivered to the rotary converter, and thereby regulating the alternator. When the plant is first started up, the converter is operated mechanically in any suitable way as a continuous-current generator, but as soon as the main machine is running and its excitation has risen to a proper amount the mechanical connection may be dispensed with and the converter will be run by current from the main lines.

The accompanying drawing is a diagrammatic illustration of my invention embodying its principles.

In the drawing, A is the armature of the main alternator, having field-magnets B B and the usual collecting device F, through which current passes to the lines $a\ b$.

A' is the armature of the rotary converter, which is provided with field-magnets B' B', the collecting device F', and the commutator G. From the commutator current passes over the lines $c\ d$ to the field-magnets of the main alternator, the field-magnets B' B' of the converter being in shunt to this circuit. The usual resistance R' is provided in the shunt field-circuit of the converter for regulating its output. A mechanical connection (represented as a friction-clutch at K) is also provided, by which the converter may be started and brought up to speed, the converter-armature being illustrated as upon a continuation $x$ of the main shaft X of the alternator. Any other suitable connection, as by a belt or gearing, might be substituted.

E is the transformer, provided with the primary coil C in shunt to the mains $a\ b$, a secondary coil D, from which leads pass to the collecting device F' of the converter, and a modifying-coil M in series in the main $b$. A resistance R is arranged in shunt to the modifying-coil for the purpose of controlling its effect. An air-gap E' is introduced between the main core and the part of the core upon which the coil M is wound. The coil M is so wound as to oppose the passage of lines of force through the shunt, as already explained. The winding of the coil C is connected in shunt across the mains, being thus fed at approximately constant potential, and thereby producing an approximately constant magnetic flux. The coil M is, however, a series coil, and its effect varies according to the current in the circuit $a\,b$, feeding the lamps L. As the load increases the coil M has greater and greater effect in obstructing the passage of the lines of force through the magnetic shunt, compelling more and more of them to thread the coil D and increasing the electromotive force and current in that coil, and thus delivering more current to the armature A' of the converter, which in turn sends out more current to the field-magnets B B of the alternator.

Variation of the resistance R in shunt to the modifying-coil would act, as is well understood, to change the ratio of compounding or overcompounding of the machine by letting more or less of the main current pass through the coil, while variations of the resistance R' would, as in the case of the ordinary exciter, change the output of the main machine in a way well understood in the art.

At $R^2$, I have shown in dotted lines a resistance in series with the primary coil C, by means of which the no-load excitation of the machine may be controlled.

The transformer, arranged as described, not only compounds for change of current on change of load, but also for phase-displacement, lagging current assisting the electromotive force of the secondary, while when the current leads this electromotive force is cut down. This is because the magnetism lags ninety degrees behind the wave of electromotive force. If therefore the current in the modifying-coil lags, it comes more nearly in phase with the magnetism until, if it lags as much as ninety degrees behind the electromotive force, it coincides in phase exactly with the magnetism. This would be the condition of greatest compounding. The coil, being differentially wound, then opposes the passage of lines of force through the magnetic shunt with greater effect than at any other phase relation. If, however, the current leads, this is reversed. It opposes the magnetism less and less until, if it leads as much as ninety degrees, it would assist the magnetism in the shunt to the maximum amount and divert the greatest number of lines of force from the secondary coil through the air-gap. At the same time the rotary converter furnishes an efficient way of commuting the resultant secondary current, inasmuch as it has the field of a continuous current-generator, and thus has a definite line of commutation, enabling it to operate sparklessly.

I do not claim the special transformer herein illustrated, as it is not of my invention, this consisting in the particular combination of apparatus which operates with peculiar efficiency.

What I claim as new, and desire to secure by Letters Patent of the United States, is—

1. In combination, an alternating-current dynamo-electric machine, a transformer having a primary coil in shunt to the mains, a secondary, and a modifying magnetic shunt, and a rotary converter connected upon its alternating-current side to the transformer-secondary, and upon its other side to the field-magnets of the alternator.

2. An alternating-current dynamo-electric machine, a transformer having a primary coil connected across the circuit, a secondary coil, and a series modifying-coil upon a part of the core forming a shunt to the magnetic circuit of the transformer; in combination with a rotary converter having its armature connected upon the alternating-current side with the transformer-secondary, and on the other side through a commutator with the field-magnets of the alternator.

3. An alternating-current dynamo-electric machine, a transformer having a primary coil connected across the circuit, a secondary coil and a series modifying-coil wound to oppose the passage of lines of force through a part of the core forming a shunt to the magnetic circuit of the transformer; in combination with a rotary converter having its armature connected to the secondary of the transformer, and through a commutator to the field-magnets of the alternator and to its own field-magnets.

4. An alternating-current dynamo-electric machine, a transformer having a primary coil in shunt to the mains, a secondary coil and a series modifying-coil wound upon the part of the core forming a shunt to the magnetic circuit of the transformer; in combination with a rotary converter having its armature connected upon the alternating-current side to the secondary coil of the transformer, and upon the continuous-current side to the field-magnets of the alternator and its own field-magnets, and regulating resistances for controlling the current in the transformer and the output of the converter.

In witness whereof I have hereunto set my hand this 13th day of May, 1896.

EDWIN W. RICE, Jr.

Witnesses:
 B. B. HULL,
 M. H. EMERSON.